United States Patent
Chen et al.

(10) Patent No.: US 7,265,971 B2
(45) Date of Patent: Sep. 4, 2007

(54) COMPUTER FRONT BEZEL

(75) Inventors: Yun-Lung Chen, Tu-Cheng (TW); Chang-Jiang Hou, Shenzhen (CN); Qing-Hua Huang, Shenzhen (CN)

(73) Assignees: Hong Fu Jin Precision Industry (Shenzhen) Co., Ltd., Bao-an District, Shenzhen City, Guangdong Province (CN); Hon Hai Precision Industry Co., Ltd., Tu-Cheng City, Taipei Hsien (TW)

( * ) Notice: Subject to any disclaimer, the term of this patent is extended or adjusted under 35 U.S.C. 154(b) by 231 days.

(21) Appl. No.: 11/117,237

(22) Filed: Apr. 28, 2005

(65) Prior Publication Data

US 2005/0286216 A1 Dec. 29, 2005

(30) Foreign Application Priority Data

Jun. 23, 2004 (CN) .................. 2004 2 0071026 U

(51) Int. Cl.
*G06F 1/16* (2006.01)
*H05K 5/00* (2006.01)

(52) U.S. Cl. ...................... 361/683; 361/679; 361/724; 174/50; D14/444

(58) Field of Classification Search ................ 361/679, 361/683, 724–727; 312/223.1, 223.2, 326; 174/50; D14/444, 349
See application file for complete search history.

(56) References Cited

U.S. PATENT DOCUMENTS

| 6,130,822 | A | * | 10/2000 | Della Fiora et al. | ........ 361/724 |
| D442,175 | S | * | 5/2001 | Lee et al. | ........ D14/349 |
| 6,286,916 | B1 | * | 9/2001 | Chen et al. | ........ 312/223.2 |
| 6,466,435 | B2 | * | 10/2002 | Dong | ........ 361/685 |
| 6,478,392 | B2 | * | 11/2002 | Gan et al. | ........ 312/326 |
| 6,603,655 | B2 | * | 8/2003 | Hrehor et al. | ........ 361/683 |
| 6,798,664 | B2 | | 9/2004 | Lin et al. | |
| D525,253 | S | * | 7/2006 | Hu et al. | ........ D14/444 |
| 7,131,711 | B2 | * | 11/2006 | Chen | ........ 312/223.2 |

FOREIGN PATENT DOCUMENTS

CN 2566322 Y 8/2003

* cited by examiner

*Primary Examiner*—Lisa Lea-Edmonds
(74) *Attorney, Agent, or Firm*—Morris Manning & Martin LLP; Tim Tingkang Xia, Esq.

(57) ABSTRACT

A computer front bezel includes a body (20) and a cover (40). The cover is pivotably secured to the body. A top wall (46) extends inwardly from the cover. At least one input/output (I/O) hole (462) is defined in the top wall corresponding to I/O sockets of a circuit board mounted on the cover. Wherein the cover is rotated to uncover the I/O holes.

20 Claims, 6 Drawing Sheets

COMPUTER FRONT BEZEL

BACKGROUND OF THE INVENTION

1. Field of the Invention

The present invention relates to computer front bezels, and particularly to a computer front bezel having a cover to protect input/output (I/O) sockets.

2. Background of the invention

Usually, a computer maybe connect with some electronic devices, such as USB flash, earphone, and microphone. A plurality of input/output (I/O) holes, such as Universal Serial Bus (USB) holes corresponding to the USB flashes, is thus needed to define in the computer for plugging the electrical devices. In conventional computer, the I/O holes are defined in a rear plate of the computer. It is inconvenient for the user to plug the electrical devices into the I/O holes.

Another computer is disclosed in China Patent No. 01279787.1. The I/O holes are defined in a front bezel of the computer. A cover is pivotably mounted to the front bezel for covering the I/O holes. When the user sits in front of the computer, the aforementioned electrical devices are easy to be plugged into the I/O holes. However, the computer is often placed under a desk. It is also inconvenient to plug the electrical devices into the I/O holes.

What is needed, therefore, is a computer front bezel with a cover having a plurality of I/O holes.

SUMMARY

A computer front bezel includes a body and a cover. The cover is pivotably secured to the body. A top wall extends inwardly from the cover. At least one input/output (I/O) hole is defined in the top wall corresponding to I/O sockets of a circuit board mounted on the cover. Wherein the cover is rotated to uncover the I/O holes.

Other advantages and novel features of the present invention will be drawn from the following detailed description of preferred embodiment with attached drawings, in which:

DETAIL DESCRIPTION OF PREFERRED EMBODIMENT

Figure 1:
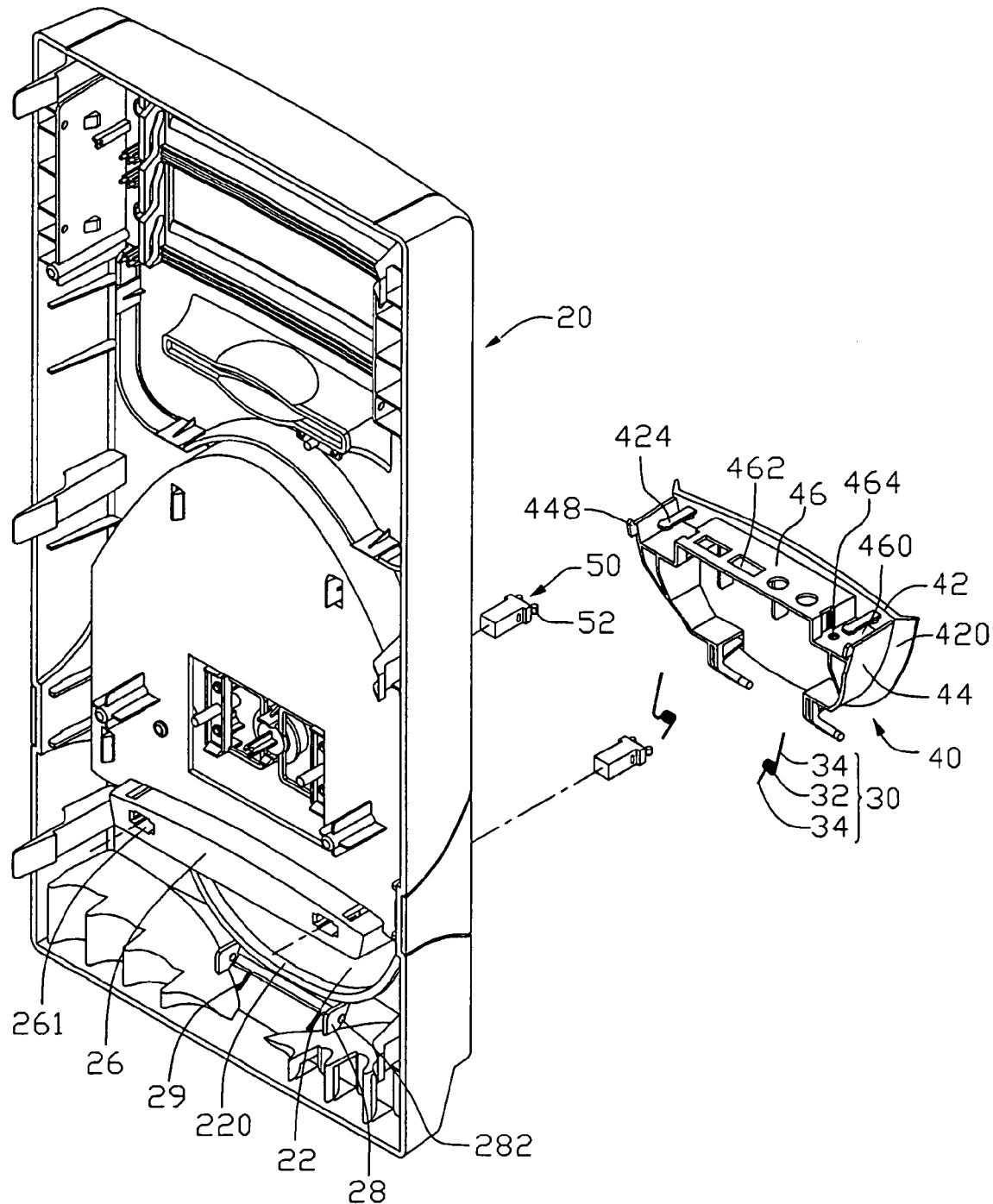
FIG. 1 is an exploded, isometric view of a front bezel in accordance with preferred embodiment of the present invention, the front bezel comprising a body, a pair of latches, a pair of springs and a cover.
Figure 2:
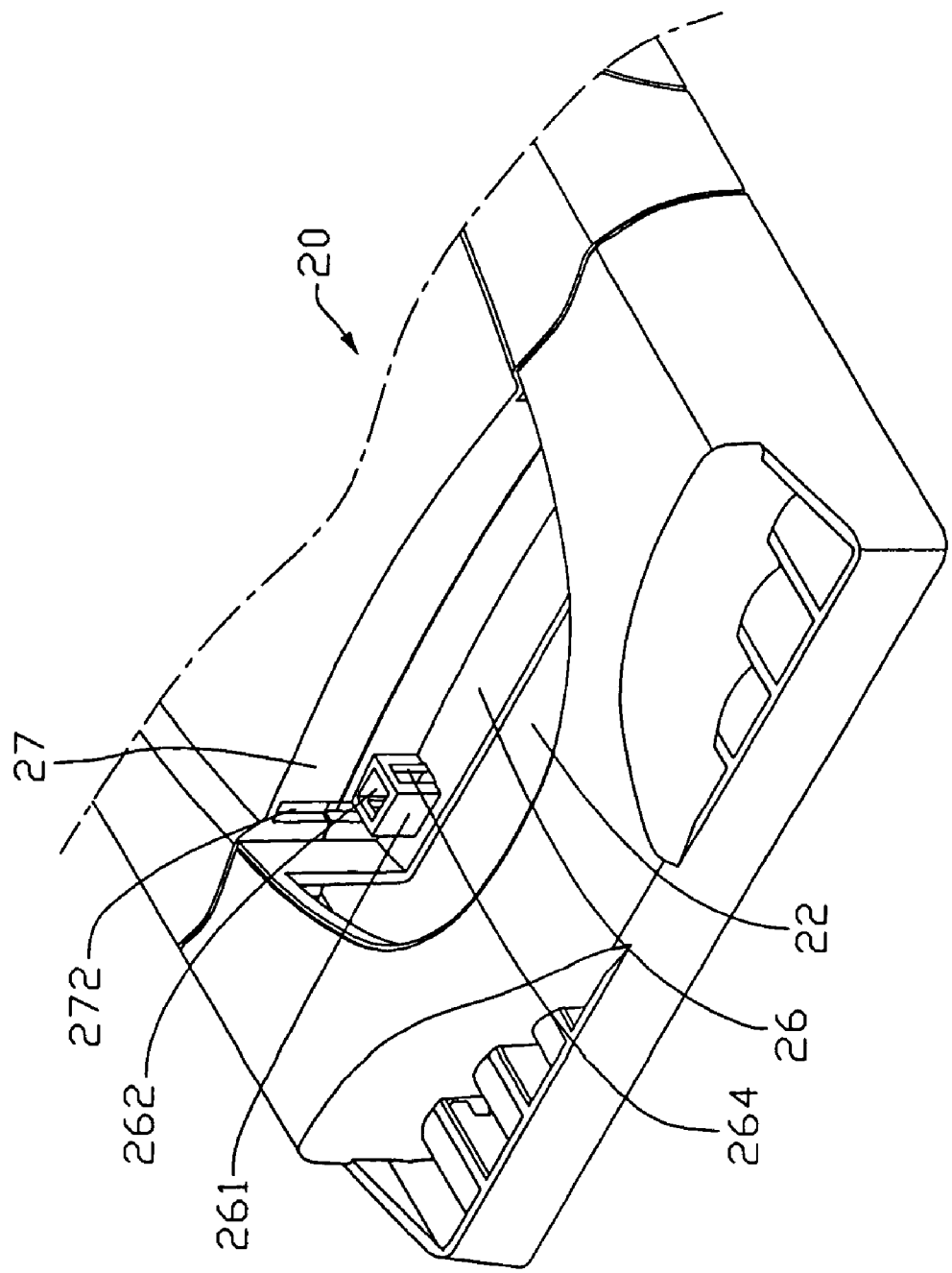
FIG. 2 is a part view of FIG. 1, but viewed from another aspect.
Figure 3:
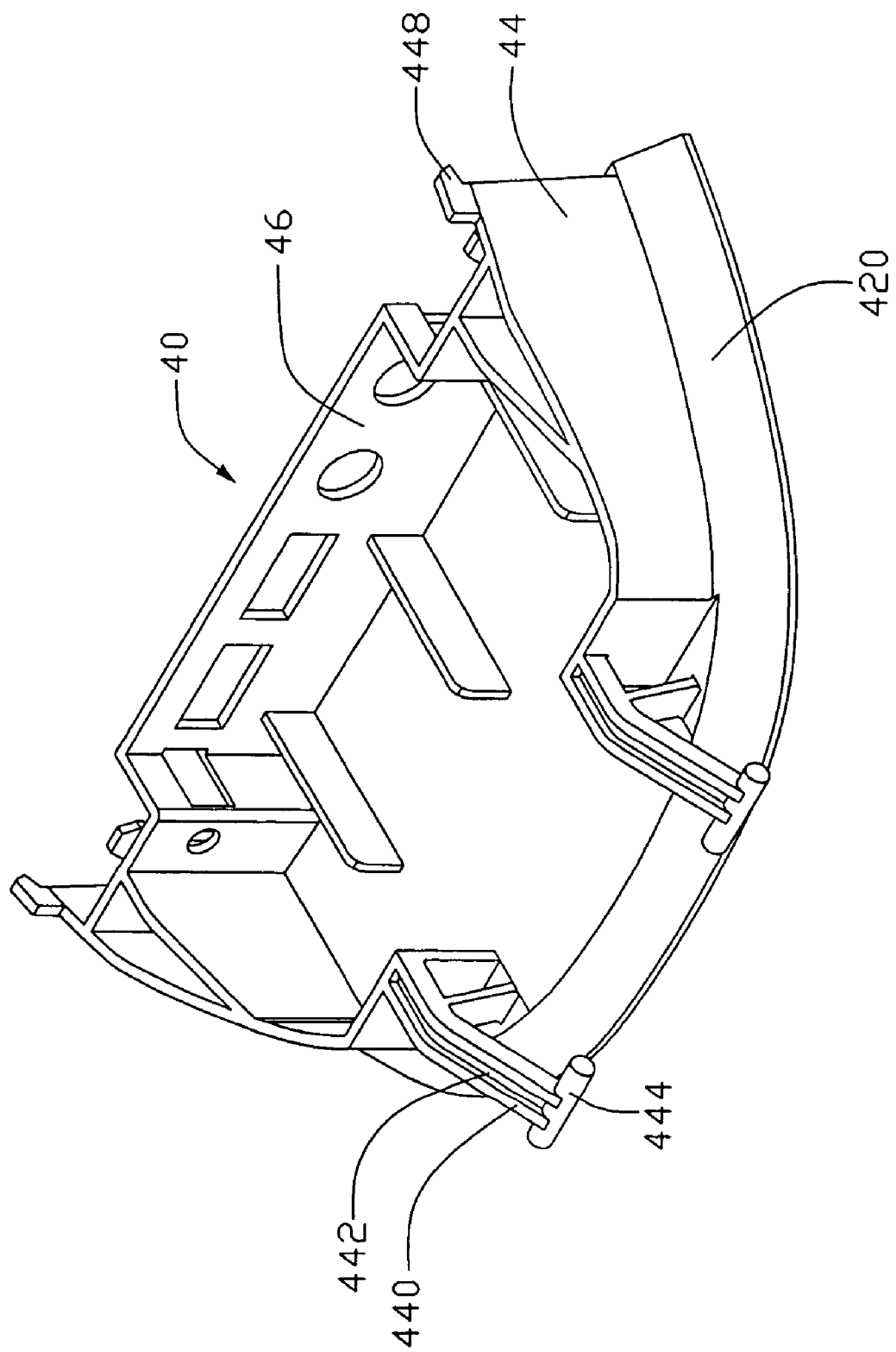
FIG. 3 is another isometric view of the cover.

Referring to FIGS. 1 to 3, a front bezel mounted to a chassis (not shown) of an electronic device like a computer comprises a body 20 and a cover 40.

The body 20 defines an opening 22 in a bottom portion thereof. A corner (not labeled) is formed at a top edge of the opening 22. The corner has a stopping wall 26 and a positioning wall 27 perpendicularly to the stopping wall 26. A pair of mounting portions 261 protrudes from the stopping wall 26. A holding opening 262 and a mounting slot 264 are defined in the mounting portion 261. The positioning wall 27 defines a pair of guiding slots 272 adjacent to the mounting portions 261 therein. A pair of mounting tabs 28 protrudes from the body 20 below the opening 22. Each of the mounting tabs 28 defines a pivot hole 282 therein. Two grooves 29 are defined in the body 20 between the mounting tabs 28.

The cover 40 comprises a base plate 42, a pair of side walls 44 and a top wall 46 perpendicular to the base plate 42. The base plate 42 has a flange 420 beyond the side walls 44. A pair of supporting feet 440 extends from bottom end of the side walls 44. A pair of projecting tabs 448 protrudes backward at top end of the side walls 44 corresponding to the guiding slot 272 of the positioning wall 27. The supporting foot 440 defines a supporting groove 442 therein and has a shaft 444 at an end. The top wall 46 has a pair of steps 460. A pair of hooks 424 projects perpendicularly from the base plate 42 adjacent to the steps 460. A plurality of input/output (I/O) holes 462 is defined in the top wall 46 between the steps 460. A mounting hole 464 is defined in the step of the top wall 46 for securing a circuit board (not shown) to the cover 40. The circuit board has a plurality of I/O sockets corresponding to the I/O holes 462 to form corresponding electrically connectable ports for the computer.

Latches 50 are conventional elements. When the hooks 424 of the cover 40 insert the corresponding latches 50, the hooks 424 are grasped. When the hooks 424 leave away from the latches 50, the hooks 424 are released.

Springs 30 are used to rotate the cover 40 out from the body 20. Each of the springs 30 has a base body 32 secured on the shaft 444 of the support foot 440 and a pair of arms 34.

Figure 4:
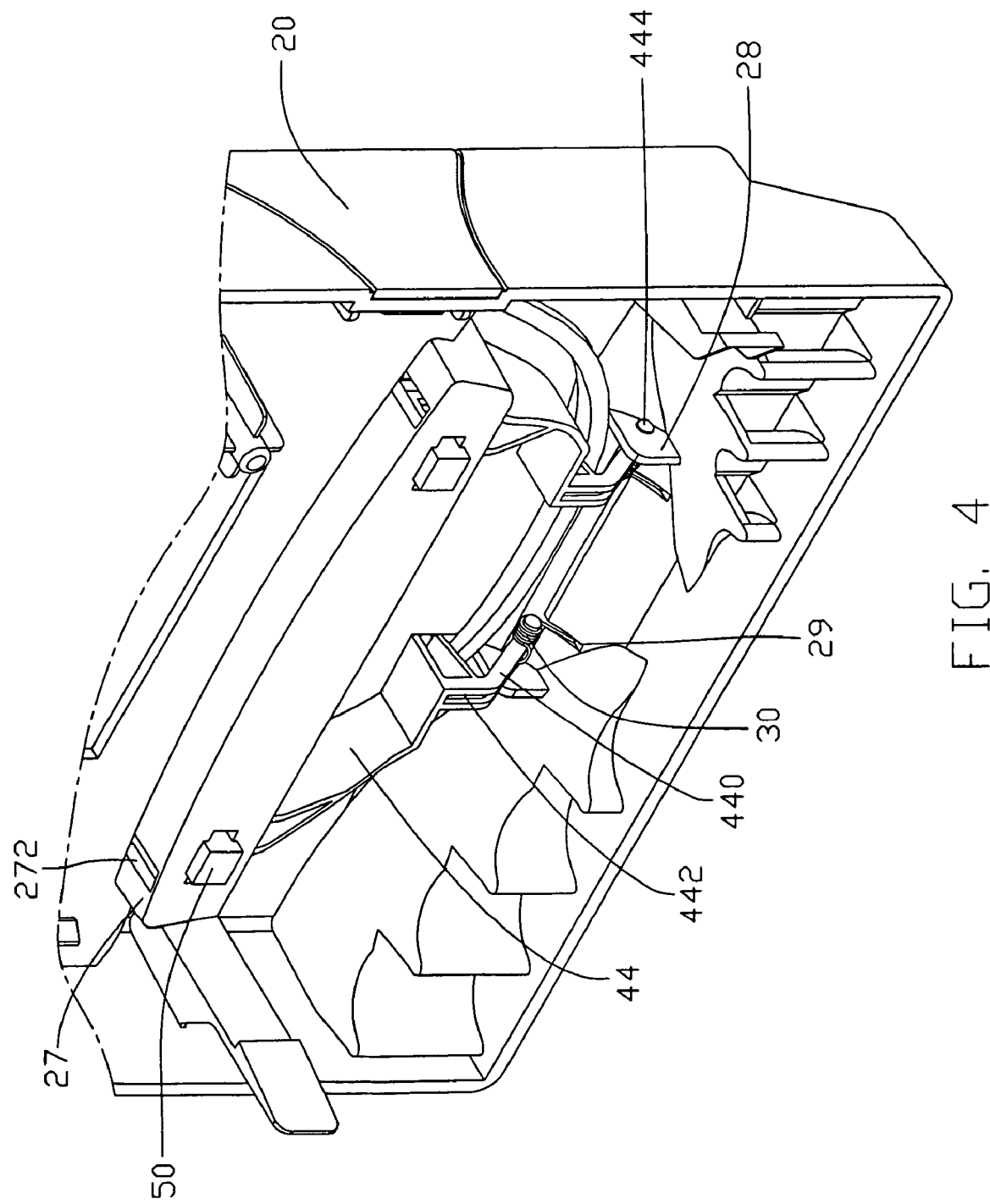
FIG. 4 is an assembly view of FIG. 1, but showing the body in a part.

Referring also to FIG. 4, in assembly, the latches 50 are secured on the mounting portion 261 of the stopping wall 26 of the body 20. The circuit board is mounted on the cover 40 among the side walls 44 and the top wall 46, and the I/O sockets of the circuit board align with the I/O holes 462 of the top wall 46. The supporting feet 440 of the cover 40 are inserted through the opening 22. The projecting tabs 448 of the cover 40 are inserted into the guiding slot 272. The base bodies 32 of the springs 30 are positioned on the corresponding shafts 444 of the supporting feet 440. One arm 34 of the spring 30 is placed into the groove 29 of the body 20, and the other arm 34 is placed into the supporting groove 442 of the supporting foot 44. Then the shafts 444 are inserted into the pivot holes 282 of the mounting tabs 28. The cover 40 is thus pivotably mounted on the body 20. The hooks 424 of the cover 40 leave away from the latches 50. The springs 30 are in original situation.

Figure 5:
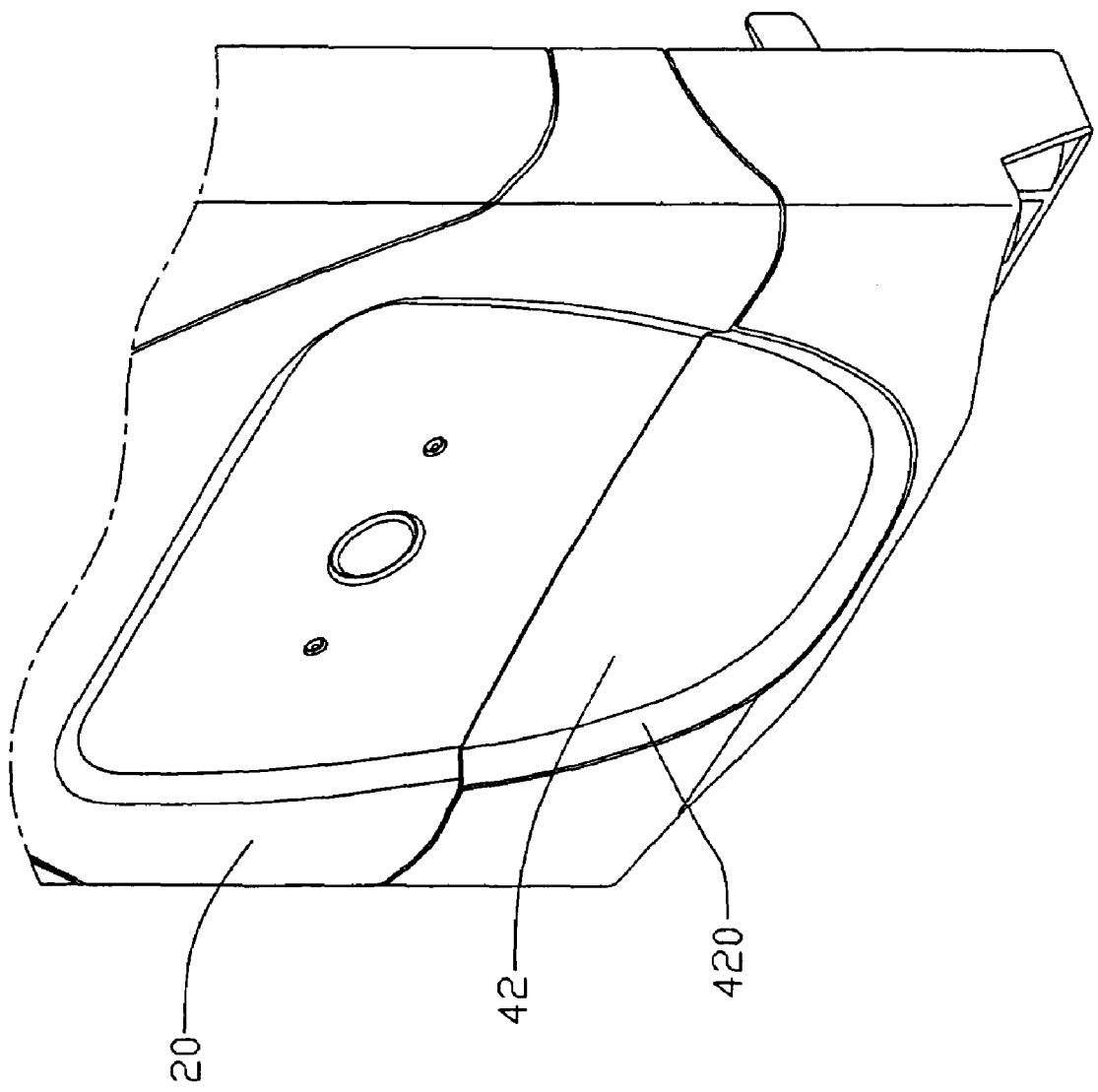
FIG. 5 is similar to FIG. 4, but viewed from another aspect.

Referring also to FIG. 5, in use, the cover 40 is pushed to rotate into the opening 22 of the body 20. The projecting tab 448 of the cover 40 moves in the guiding slot 272 of the positioning wall 27. The springs 30 elastically deform. When the hooks 424 of the cover 40 insert into the corresponding latches 50, the hooks 424 are grasped. The flange 420 of the base plate 42 depends on edges of the opening of the body 20. The I/O holes 462 of the cover 40 are concealed into the computer front bezel. The springs 30 have maximal deformations.

Figure 6:
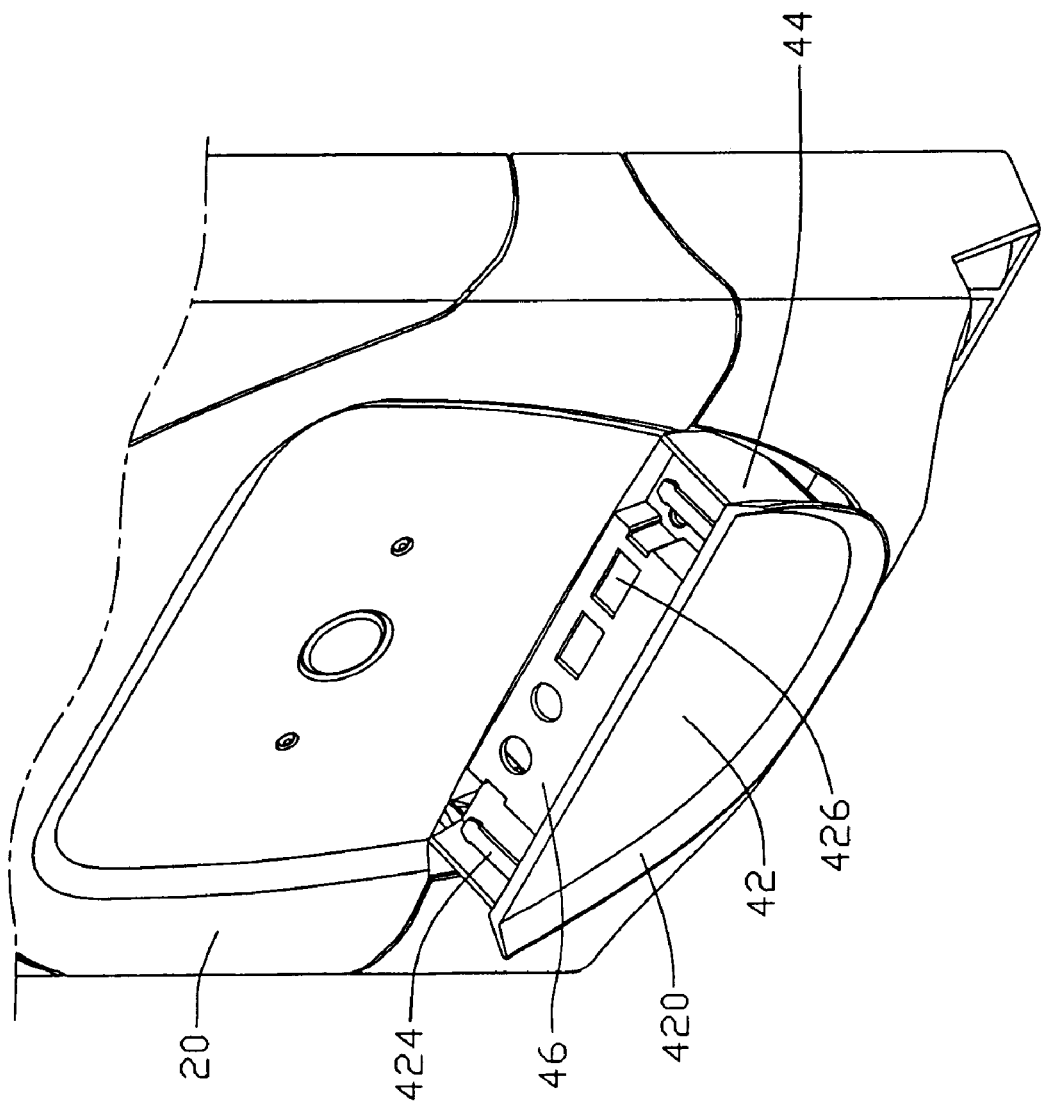
FIG. 6 is similar to FIG. 5, but showing the cover rotated out from the body.

Referring also to FIG. 6, the cover 40 is pushed again. The hooks 424 leave away and release from the latch 50. The springs 30 rebound. The cover 40 thus rotates out from the opening 22 under the pressure of the spring 30. The projecting tab 448 of the cover 40 moves reversely in the guiding slot 272 of the positioning wall 27. When the projecting tab 448 is blocked by an edge of the guiding slot 272, the I/O holes 462 are uncovered. Electrical devices, such as USB flash, earphone, and microphone, are electrically connectable with the computer through the connectable ports by inserting their corresponding I/O sockets through the I/O holes 462. The springs 30 are in original situation again.

Obviously, the cover 40 having the I/O holes 462 maybe also pivotably mounted on a top plate and side panels of the computer.

It is also obviously that the cover 40 maybe slidingly mounted on the chassis of the computer perpendicularly to the front bezel, top plate or side panels.

It is to be understood, however, that even though numerous characteristics and advantages have been set forth in the foregoing description of preferred embodiments, together with details of the structure and function, the disclosure is illustrative only, and changes maybe made in detail, especially in matters of shape, size, and arrangement of parts within the principles of the invention to the full extent indicated by the broad general meaning of the terms in which the appended claims are expressed.

We claim:

1. An electronic device comprising:
   a body of a front bezel covering a side of the electronic device; and
   a cover movably attachable to the body so as to move relative to the body between a first position where a portion of the cover is exposable out of the body and a second position where the exposable portion of the cover is enclosed by the body, at least one electrically connectable port formed on the exposable portion and movable with the cover so as to be exposable together with the exposable portion in the first position of the cover and enclosable by the body in the second position of the cover.

2. The electronic device as described in claim 1, wherein the exposable portion of the cover is a top wall of the cover extending toward the body from the cover, the at least one electrically connectable port comprises an input/output (I/O) socket on a circuit board attachable to the cover, and the I/O socket is aligned with an input/output (I/O) hole defined in the top wall so as to be exposable.

3. The electronic device as described in claim 1, wherein at least one hook is formed at the cover, and at least one latch is mounted on the body for grasping the hook.

4. The electronic device as described in claim 1, wherein at least one projecting tab protrudes from the cover, and at least one guiding slot is defined in the body for having the corresponding projecting tabs moving therein.

5. The electronic device as described in claim 1, wherein at least one spring is situated between the cover and the body for moving the cover.

6. The electronic device as described in claim 5, wherein the spring has a pair of arms, and the cover has a pair of feet each with a groove defined for receiving one arm of the spring.

7. An electronic device comprising:
   a front bezel body partially enclosing the electronic device and performing an outline of the electronic device thereby;
   a cover movably attachable to the body; and
   at least one electrically connectable port formed next to the cover in the electronic device, and movable across the outline of the electronic device to expose to an outside of the electronic device in case that the cover is moved away from the body.

8. The electronic device as described in claim 7, wherein the at least one electrically connectable port includes an input/output (I/O) socket of a circuit board mounted on the cover.

9. The electronic device as described in claim 7, wherein at least one hook is formed at the cover, and at least one latch is mounted on the body for grasping the hook.

10. The electronic device as described in claim 7, wherein at least one projecting tab protrudes from the cover, and at least one guiding slot is defined in the body for having the projecting tabs moving therein.

11. The electronic device as described in claim 7, wherein at least one spring is situated between the cover and the body for moving the cover.

12. The electronic device as described in claim 11, wherein the spring has a pair of arms, a pair of feet extends from the cover, at least one foot defines a groove for receiving one arm of the spring.

13. The electronic device as described in claim 8, wherein a top wall extends from the cover, an input/output (I/O) hole is defined in the top wall for aligning with the I/O socket of the circuit board.

14. A computer front bezel comprising:
   a body;
   a cover pivotably attached to the body;
   a guiding slot being defined in one of the body and the cover; and
   a projecting portion being formed on the other one of the body and the cover, the projecting portion sliding in the guiding slot and being blocked by an edge of the guiding slot to restrict a range of rotation of the cover while the cover is pivoted away from the body.

15. The computer front bezel as described in claim 14, wherein at least one mounting tab is formed on an inner surface of the body, and at least one foot extends from the cover for being pivotably mounted on the mounting tab of the body.

16. The computer front bezel as described in claim 15, wherein at least one spring is situated between the cover and the body.

17. The computer front bezel as described in claim 16, wherein the spring has a pair of arms, the foot defines a groove for receiving one arm of the spring.

18. The computer front bezel as described in claim 17, wherein the body of the computer front bezel defines at least one groove for receiving the other arm of the spring.

19. The computer front bezel as described in claim 14, wherein a top wall extends inward from the cover, at least one I/O hole is defined in the top wall for aligning with the I/O socket of the circuit board.

20. The computer front bezel as described in claim 14, wherein at least one hook is formed at the cover, and at least one latch is mounted on the body for grasping the hook.

* * * * *